United States Patent [19]

Matsuoka et al.

[11] 4,413,841
[45] Nov. 8, 1983

[54] SAFETY SEAT BELT ARRANGEMENT FOR AUTOMOTIVE SEAT OCCUPANT

[75] Inventors: Hideoki Matsuoka, Yokohama; Yoshinobu Kondoh, Kosai, both of Japan

[73] Assignee: Nissan Motor Company, Limited, Kanagawa, Japan

[21] Appl. No.: 277,802

[22] Filed: Jun. 26, 1981

[30] Foreign Application Priority Data

Jun. 27, 1980 [JP] Japan .............................. 55-90974[U]

[51] Int. Cl.³ ............................................. B60R 21/10
[52] U.S. Cl. ................................................. 280/802
[58] Field of Search ........................ 280/802, 803, 804

[56] References Cited

U.S. PATENT DOCUMENTS

| | | | |
|---|---|---|---|
| 3,827,714 | 8/1974 | LeFeuvre | 280/804 |
| 4,084,841 | 4/1978 | Hayashi et al. | 280/802 |
| 4,213,637 | 7/1980 | Mauron | 280/802 |
| 4,262,933 | 4/1981 | Fox | 280/802 |
| 4,324,418 | 4/1982 | Stephenson | 280/802 |

FOREIGN PATENT DOCUMENTS 48-100815 12/1973 Japan .
54-65126 5/1979 Japan .

*Primary Examiner*—Robert R. Song

[57] ABSTRACT

A safety seat belt arrangement for protecting an automotive seat occupant. According to the present invention, there is provided a safety seat belt arrangement which comprises, in addition to a first belt having a shoulder harness portion the end of which linked with a rear upper end of a door and a lap harness portion the end of which linked with a rear lower end of the door and a second belt one end held by a safety seat belt retractor and the other end linked with the first belt through a linkage ring, a projecting member located at an outboard side of the seat projecting by means of an elastic means, so as to be pushed by the door when the door is closed, an arm assembly located at the inboard side of the seat and rotatably fixed on a seat frame bracket for supporting the second belt, and a linkage member located at the rear of the seat for connecting the projecting member and the arm assembly so that the arm assembly stands upright to release the first belt from the body of the occupant when the door is closed and the projecting member is pushed, whereby the force required to open the door can be remarkably reduced.

12 Claims, 9 Drawing Figures

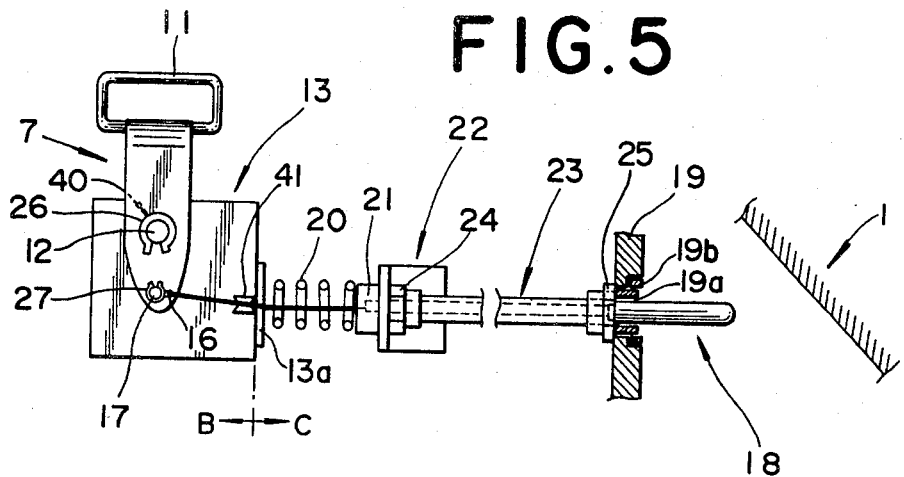
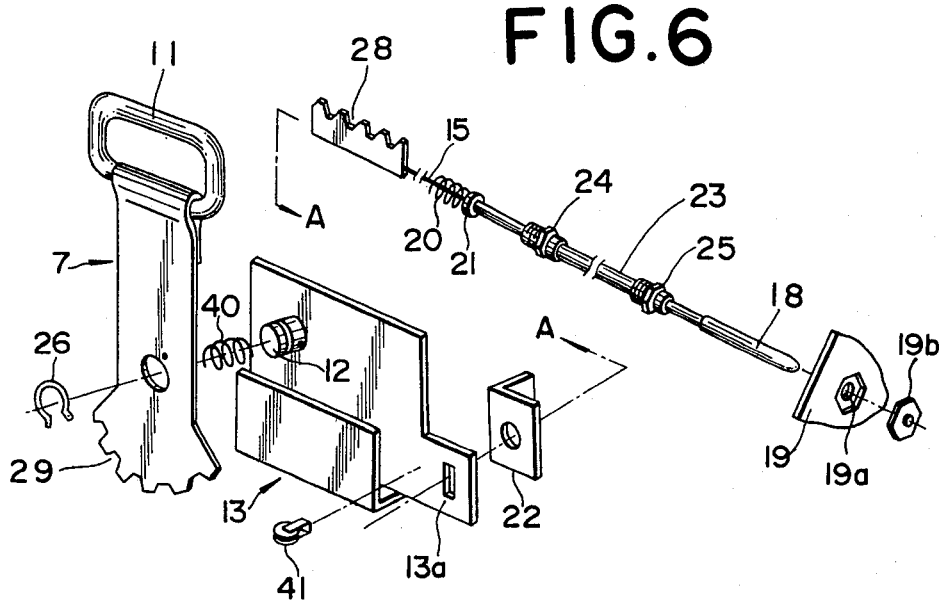
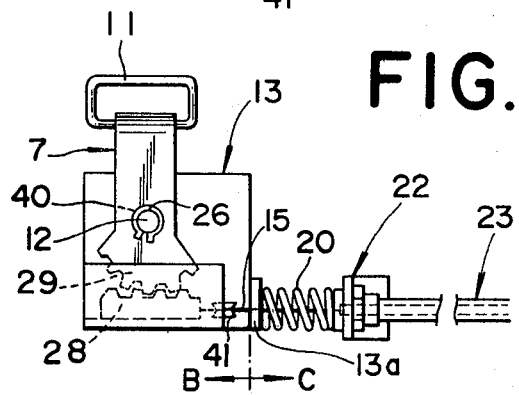

SAFETY SEAT BELT ARRANGEMENT FOR AUTOMOTIVE SEAT OCCUPANT

BACKGROUND OF THE INVENTION (1) Field of the Invention

The present invention relates to a safety seat belt arrangement for protecting the occupant of an automotive seat and particularly to a safety seat belt arrangement wherein a seat belt loosening means is provided such that the occupant-restraining seat belt assembly can immediately be displaced away from the body of an occupant in response to the opening of the door.

(2) Description of the Prior Art

A conventional safety seat belt arrangement comprises: (a) a first belt divided into a shoulder harness portion and lap harness portion by means of a pivot ring, one end of the shoulder harness portion fixed on the rear upper corner of a door inside panel and one end of the lap harness portion fixed on the rear lower corner; (b) a second belt, one end retractable into a seat belt retractor and the other end secured to the pivot ring; (c) an arm as a seat belt guide means for supporting the second belt; and (d) a linkage member for linking one end of the arm with the radially inward front lower corner of the inside door panel.

In such a conventional seat belt arrangement using the arm guide means, however, a strong force is needed to open the door since the arm guides the second belt upwards only in response to the door opening force.

SUMMARY OF THE INVENTION

With the above-described problem in mind, it is an object of the present invention to provide a safety seat belt arrangement for an automotive seat occupant wherein a projecting rod, connected to a wire connected in turn to a swinging arm as a seat belt guide means, is provided at the rear outside part of the seat so as to be pushed toward the seat when the corresponding door is closed and an elastic means is provided for biasing the projecting rod in the direction away from the seat, and whereby the projecting rod is projected and simultaneously the biasing force of the elastic means causes the arm as a seat belt guide means to be tilted, thus reducing the force required to open the door.

BRIEF DESCRIPTION OF THE DRAWINGS

The features and advantages of the present invention will be better appreciated from the following description taken in conjunction with the accompanying drawings in which like reference numerals designate corresponding elements, and in which:

FIG. 5 is a simplified side view as seen from the adjacent seat in the part B and from the rear seat in the part C of the first preferred embodiment according to the present invention with the door opened;

FIG. 6 is an exploded perspective view of a second preferred embodiment according to the present invention;

FIG. 7 is a side view as seen from the adjacent seat in the part B and from the rear seat in the part C of the second preferred embodiment in the assembled state;

DESCRIPTION OF THE PREFERRED EMBODIMENTS

Reference will be made to the drawings from FIG. 1 to FIG. 9. First, FIG. 1 shows a conventional safety seat belt arrangement mounted in an automotive vehicle.

Figure 1:
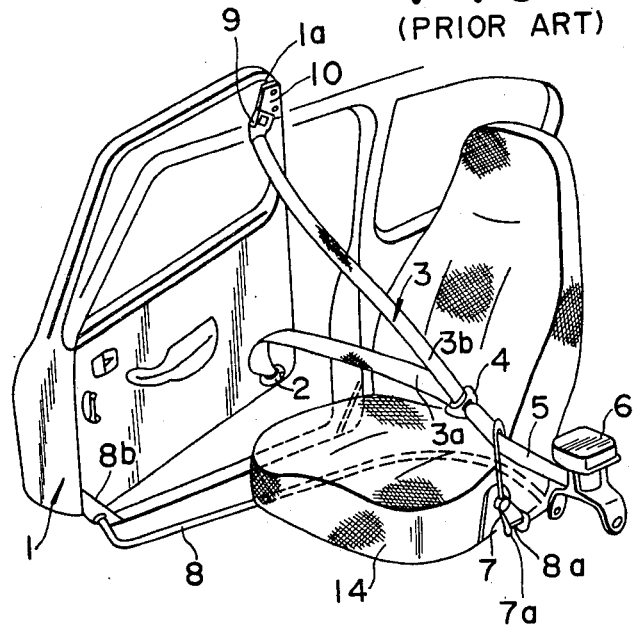
FIG. 1 is a perspective view of a conventional seat belt arrangement in an automotive vehicle.

As shown in FIG. 1, the conventional safety seat belt arrangement comprises a first belt 3 whose one end of a shoulder harness portion 3b is attached to the rear upper portion of an inside door panel 1 and the other end of a lap harness portion 3a to the rear lower portion of the inside door panel 1 by means of an anchor 2, a second belt 5 with one end connected to the first belt 3 through a pivot ring 4, a safety belt retractor 6 which performs reeling out or retraction of the other end of the second belt 5, an arm 7 which serves as a belt guide means for supporting the second belt 5, a linkage member 8 whose one end 8b is attached to the front lower corner of the inside door panel 1 and the other end 8a to one end 7a of the arm 7 so that the arm 7 stands upright from the seat cushion 14 and tilts as the inside door panel 1 is opened and closed, driven by the door-opening or closing force.

Figure 2:
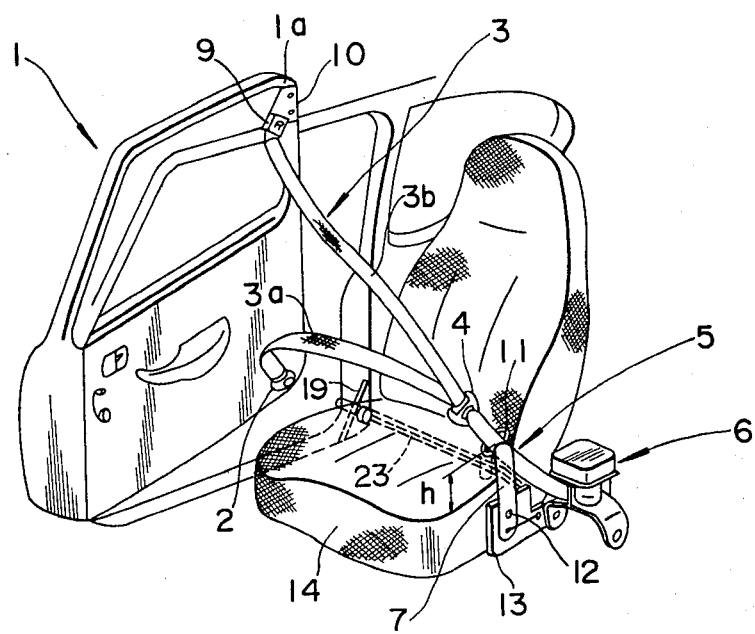
FIG. 2 is a perspective view of a seat belt arrangement of a first preferred embodiment according to the present invention.

FIG. 2 shows a first preferred embodiment of the safety seat belt arrangement according to the present invention.

In FIG. 2, an emergency release buckle 9 attached to one end of the shoulder harness portion 3b of the first belt 3 is secured to a door sash anchor 10 provided at a sash portion 1a of the rear upper corner of the inside door panel 1. The first belt 3 is inserted through a hole of the pivot ring 4, the second belt 5 attached through the other hole of the pivot ring 4. Thus, the first belt 3 and one end of the second belt 5 are linked together at the pivot ring 4 so that the first belt is slidably adjustable. The other end of the second belt 5 is retracted into the belt retractor 6. The belt retractor 6 locks the second belt 5 by sensing an acceleration or deceleration of the automotive vehicle in case of emergency at the time of collision. The arm 7 serves as a seat belt guide means for supporting the second belt 5. One end of the arm 7 is provided with a second pivot ring 11 through which the second belt 5 passes and the other end thereof is rotatably fixed on a first axle 12 provided on a seat frame bracket 13 and restrained by the snap ring 26. A first coil spring 40 of spring constant $K_1$ provided on the first axle 2, with one end fixed to the first axle 12 and the other end fixed to the arm 7, urges the arm 7 toward the tilted position. When the arm 7 stands upright the arm 7 lifts the second belt 5 to a predetermined height h above the upper surface of the seat cushion 14 and in the tilted state the second belt 3 is lowered.

Figure 3:
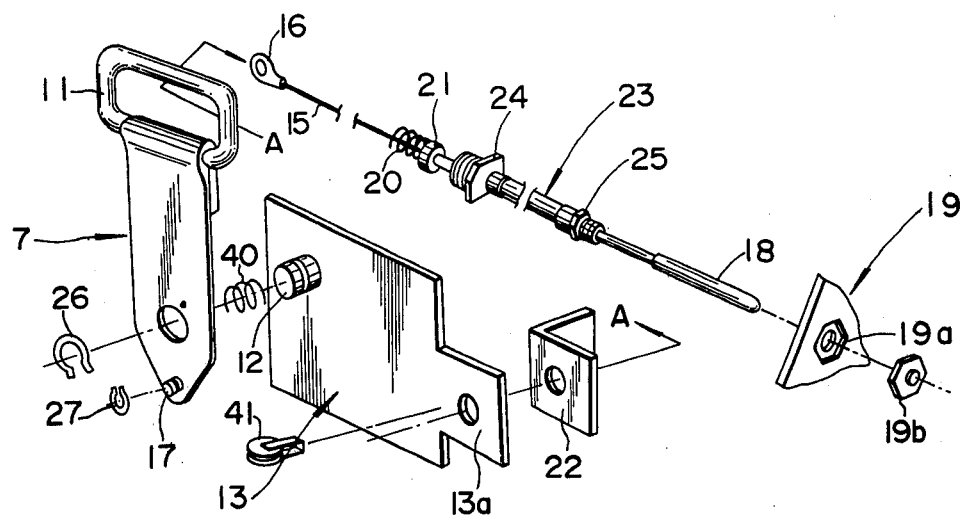
FIG. 3 is an exploded perspective view of the first preferred embodiment of the present invention.
Figure 4:
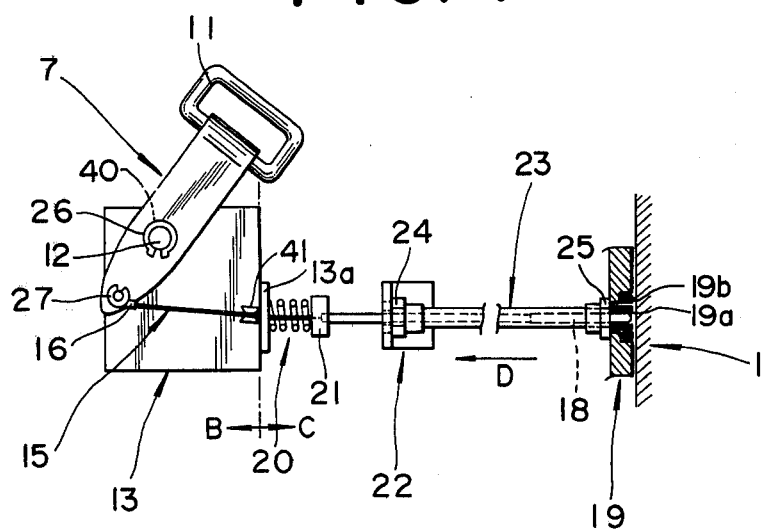
FIG. 4 is a simplified side view as seen from an adjacent seat in a part B and from a rear seat in a part C of the first preferred embodiment according to the present invention with the door closed.

In the first preferred embodiment shown in FIGS. 3 through 5, one end of the wire 15 is provided with a lug 16. This end of the wire 15 is connected with the arm 7 by fitting the lug 16 onto a second axle 17 projecting from the lower end of the arm 7. The lug 16 is retained on the second axle 17 by the snap ring 27. The wire 15 passes rearward to a pulley 41 which is rotatably fixed to the seat frame bracket 13 at the rear inboard corner of the seat cushion 14. The pulley 41 guides the wire 15 around the corner of the seat cushion 14 so that the wire 15 leads outboard toward the inside door panel 1. The wire 15 passes through hole in tab 13a provided in the seat frame bracket 13 and through a second coil spring 20 of spring constant $K_2 > K_1$, and is secured to a stop 21 in the form of a disc. Movement of the second coil spring 20 is restrained by the tab 13a and the stop 21. A bracket 22 fixed at the rear of the frame of seat cushion 14 restrains the movement of the stop 21. The range of movement of stop 21 will be seen later in the disclosure to determine the range of rotation of the arm 7. A guide sleeve 23 is positioned between the bracket 22 and the body wall 19. The ends of the guide sleeve 23 pass through holes provided in the bracket 22 and body wall 19, and are secured by the nuts 24 and 25 respectively. A recess can be provided in the body wall 19 for the nut 25 and a hexagon nut 19b to permit the door 1 to fit flush with the body wall 19. A rod 18 passes through the guide sleeve 23, with one end secured to the stop 21, and the other end passing through a hole 19a in the body wall 19 and being rounded to form a plunger.

The first preferred embodiment shown in FIG. 3 comprises the above-described construction. The operation of the first preferred embodiment can be understood by reference to FIGS. 4 and 5.

When the door is closed as shown in FIG. 4, the plunger end of the rod 18 is pushed in an arrow-marked direction D within the body wall 19. Thus, the stop 21 moves inboard, relieving tension on the wire 15. As this tension is relieved, the first coil spring 40 and the retractor 6 tilts the arm 7 downward, so that the wire 15 is always under some slight tension. As the arm 7 tilts downward, the second belt 5 passing through the second pivot ring 11 is guided downward and toward the occupant, so that when the arm 7 is in the fully-tilted position, the first belt 3 firmly restrains the occupant.

When the door is open as shown in FIG. 5, the plunger end of the rod 18 is free to slide out through the hole 19a in the body wall 19. The second coil spring 20 is thus allowed to expand, pushing the stop 21 to its limit at the bracket 22. The wire 15 in turn pulls on the second axle 17 so that the arm 7 is tilted to the full-upright position. Thus, the second belt 5 is lifted up and away from the occupant, facilitating movement into and out of the seat.

FIGS. 6 and 7 show a second preferred embodiment of the seat belt arrangement according to the present invention.

In place of the lug 16 as in the first preferred embodiment, a rack 28 is provided at one end of the wire 15. The rack 28 is engaged with the gear teeth 29 provided at the lower end of the arm 7 so that the arm 7 is rotated about the axle 12.

Figure 8:
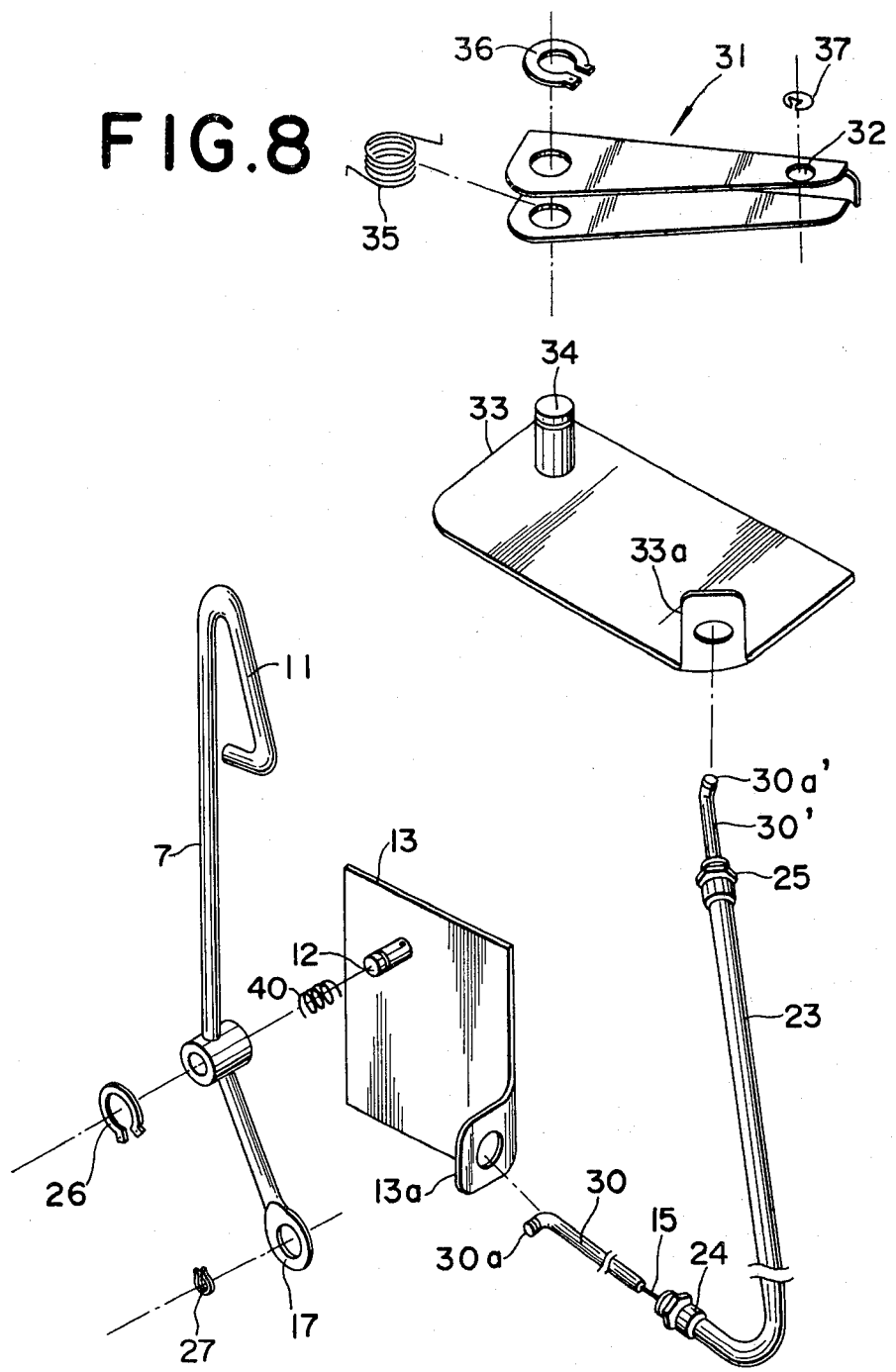
FIG. 8 is a perspective view of a third preferred embodiment according to the present invention.
Figure 9:
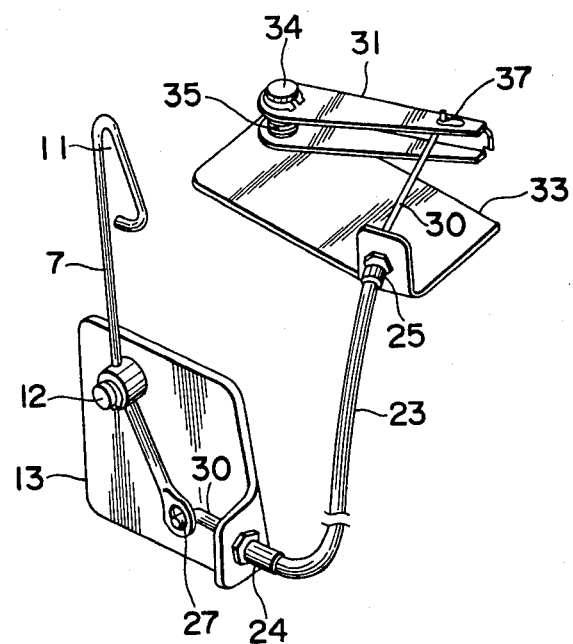
FIG. 9 is a perspective view of the third preferred embodiment according to the present invention.

FIGS. 8 and 9 show a third preferred embodiment of the seat belt arrangement according to the present invention.

One end of the wire 15 is provided with a shaft 30 forming a hook 30a at one end of a seat side thereof. The hook 30a is fitted into a hole provided at one end 17 of the arm 7 so that one end of the wire 15 is connected with the arm 7. A shaft 30' provided at the other end of the wire 15 is fitted into a hole 32 of another arm 31 which rotates by means of the inside door panel 1 on an axle 34 projecting from a base plate 33, and which is restrained by means of a snap ring 36. The arm 31 is biased toward the inside door panel 1 by means of a third coil spring 35 on axle 34. The guide sleeve 23, one end attached through the hole 13a of a base plate 13 by means of the nut 24 and the other end attached to another projection 33a of the base plate 33 by means of the screw 25. A snap ring 26 holds the arm 7 onto the axle 12 of the seat frame bracket 13. Numerals 27 and 37 denote snap ring retainers for the shafts 30 and 30'.

The operation of the third preferred embodiment shown in FIGS. 8 and 9 differs slightly from that of the first two preferred embodiments. The torsional action of the third coil spring 35, having spring constant $K_3 > K_1$, analogously replaces the linear action of the second spring 20 shown in the first and second preferred embodiments. Also, the force of the third coil spring 35 is delivered solely through the wire 15, as compared to the rod 18-to-wire 15 system in the first and second preferred embodiments. However, the interaction of the inside door panel 1 and the arm 7 remains the same as in the first two preferred embodiments.

As described hereinbefore according to the present invention there is provided the projecting rod pushed inward when the door is closed and elastic means for biasing the projecting rod toward the projecting direction, whereby the elastic means causes the seat belt guide means to be actuated simultaneously when the projecting rod is projected during the opening of the door. Consequently, the door can be opened with greater ease than in the prior art system.

It will be fully understood by those skilled in the art that the foregoing description is in terms of preferred embodiments of the present invention wherein various changes and modifications may be made without departing from the spirit and scope of the invention, which is to be defined by the appended claims.

(Reference numerals)

1 . . . inside door panel, 2 . . . anchor, 3 . . . first belt,
3a . . . lap harness portion, 3b . . . shoulder harness portion,
4 . . . first pivot ring, 5 . . . second belt,
6 . . . safety seat belt retractor, 7 . . . arm,
8 . . . linkage member, 9 . . . emergency release anchor,
10 . . . sash anchor, 11 . . . second pivot ring, 12 . . . first axle,
13 . . . seat frame bracket, 14 . . . seat cushion,
15 . . . wire, 16 . . . lug, 17 . . . second axle,
18 . . . rod, 19 . . . body wall, 20 . . . second coil spring,
21 . . . stop, 22 . . . bracket, 23 . . . guide sleeve,
24,25 . . . nuts, 26,27 . . . snap rings, 28 . . . rack,
30,30' . . . shaft, 31 . . . arm, 40 . . . first coil spring,
41 . . . pulley

What is claimed is:

1. A safety seat belt arrangement for an automotive vehicle, comprising:
 (a) a first belt, having one end supported so as to be brought in contact with a shoulder portion of a seat occupant and the other end supported so as to be brought in contact with the lap of the seat occupant;
 (b) a second belt, having one end secured to a first pivot ring having a hole through which said first belt is inserted and the other end held by a belt retractor located at the inboard side of the seat;
 (c) a projecting member engageable with a portion of the door and movable inwardly when the door is closed, and free to move outwardly when the door is open;

(d) an elastic means for biasing said projecting member so as to urge said projecting member toward the outboard side of the seat;

(e) an arm assembly rotatably supported on a frame member located on the inboard side of the seat, having a means for supporting said second belt at one end thereof and an axle at the other end thereof;

(f) a stop, positioned between said elastic means and projecting member and fixed to the inboard side of said projecting member;

(g) a wire for translating the movement of said stop to said engagement means, having one end fixed to said stop and the other end rotatably attached to said axle of said arm assembly;

(h) a pulley for guiding said wire between said stop and axle of said arm assembly, being positioned at the rear inboard corner of the seat; and (i) a bracket attached to the rear of the seat for limiting the range of movement of said stop, the range of movement of said stop determining the range of rotation of said arm assembly, so that said second belt and, consequently, said first belt are moved away from the seat occupant, when said projecting member moves outwardly and the door is open.

2. A safety seat belt arrangement as set forth in claim 1 wherein said elastic means is a coil spring.

3. A safety seat belt arrangement as set forth in claim 1, further comprising a guide sleeve having one end fixed to said bracket and the other end penetrating and fixed to the vehicle body wall and having a longitudinal hole through which said projecting member can be movably disposed.

4. A safety seat belt arrangement as set forth in any one of claims 2 or 3, wherein said projecting member is a rod.

5. A safety seat belt arrangement for an automotive vehicle, comprising:

(a) a first belt, having one end supported so as to be brought in contact with a shoulder portion of a seat occupant and the other end supported so as to be brought in contact with the lap of the seat occupant;

(b) a second belt, having one end secured to a first pivot ring having a hole through which said first belt is inserted and the other end held by a belt retractor located at the inboard side of the seat;

(c) a projecting member engageable with a portion of the door and movable inwardly when the door is closed, and free to move outwardly when the door is open;

(d) an elastic means for biasing said projecting member so as to urge said projecting member toward the outboard side of the seat;

(e) an arm assembly rotatably supported on a frame member located on the inboard side of the seat, having a means for supporting said second belt at one end thereof and an axle at the other end thereof;

(f) a base plate located at the outboard side of the seat having another axle projecting therefrom around which said elastic means is wound and having a hole; a first shaft having a first hook at the end thereof fixed on said axle of said arm assembly; a second shaft having a second hook at the end thereof fixed on one end of said projecting member; a wire for connecting said first shaft to said second shaft; and a guide sleeve for guide said wire between said first shaft and said second shaft.

6. A safety seat belt arrangement as set forth in claim 5, wherein said projecting member is an elongated lever, one end of which is rotatably fixed on said axle of said base plate and engaged with a coil spring such that a free end of said elongated lever is projected from the outboard side of the seat.

7. A safety belt arrangement for an automotive vehicle, comprising:

(a) a fastening means for fastening a body of a seat occupant including a first belt, having one end supported so as to be brought in contact with a shoulder portion of the seat occupant and the other end supported so as to be brought in contact with a lap of the seat occupant, a first pivot ring having a hole through which said first belt is inserted, and a second belt, having one end secured to said first pivot ring and the other end held by a belt retractor located at the inboard side of the seat for winding and unwinding said second belt;

(b) a guide arm assembly pivotably supported on a frame member located on the inboard side of the seat, one end thereof being slidably engaged with said second belt for holding said second belt selectably in either the restraining or nonrestraining position for the body of the seat occupant;

(c) a projecting member biased so as to project toward a first position outside of the vehicle and engageable with the vehicle door to be moved toward a second position within the vehicle when the door is closed, said projecting member being free to move to said first position when the door is open and a displacement between said first and second positions being substantially parallel to the pivotal axis of said guide arm assembly, said projecting member including a lever pivotably supported at one end thereof by an axle disposed near the vehicle door and by a spring connected at one end to said axle and at the other end to said lever, said spring being in compression when the door is closed to pivot said lever toward the second position within the vehicle, and wherein said elongated rod assembly is attached to a point near the free end of said lever; and (d) an elongated rod assembly, connected between one end of said projecting member and the other end of said guide arm assembly for transmitting tensional and compressional forces of said projecting member to said guide arm assembly so as to move said second belt and accordingly said first belt between the restraining and nonrestraining positions, whereby when the vehicle door is opened, said guide arm assembly is moved in the direction of holding said second belt in the nonrestraining position.

8. A seat belt arrangement for an automotive vehicle, comprising:

(a) a seat belt disposed with respect to a vehicle seat and the occupant thereof so as to be movable between a restraining position and a nonrestraining position;

(b) a guide arm for said seat belt supported near the vehicle seat so as to pivot about a substantially horizontal, substantially lateral axis between a first position and a second position in which said guide arm holds said seat belt in the restraining and non-restraining positions respectively;

(c) a first means for biasing said guide arm toward the first position;

(d) a projecting member disposed near a vehicle door so as to be slidable along an axis substantially parallel to the pivital axis of said guide arm and engageable with the door to be moved toward the inside of the vehicle when the door is closed and to be free to move toward the outside of the vehicle when the door is opened;

(e) a second means for biasing said projecting member toward the outside of the vehicle;

(f) a wire connected between said projecting member and an engagement pin of said guide arm spaced apart from the pivotal axis thereof; and (g) a pulley rotatable about an axis substantially perpendicular to a plane defined by the axis of movement of said projecting member and said engagement pin of said guide arm and disposed near the seat at such a position that the motion of said projecting member as the door is opened and closed is translated into motion substantially perpendicular to the pivotal axis of said guide arm.

9. The seat belt arrangement of claim 8, wherein said first means is a coil spring.

10. The seat belt arrangement of claim 8, wherein said second means comprises:
 (a) another coil spring located between said pulley and projecting member so as to bias said projecting member toward the outside of the vehicle body;
 (b) a stop, positioned between said other coil spring and projecting member and fixed to the inboard end of said projecting member; and
 (c) a bracket attached to the rear of the vehicle seat for limiting the range of movement of said stop, the range of movement of said stop determining the range of rotation between the first and second positions of said guide arm.

11. The seat belt arrangement of claim 10, which further comprises a guide sleeve having one end fixed to said bracket and the other end penetrating and fixed to the vehicle body wall and having a longitudinal hole through which said projecting member can movably be disposed.

12. The seat belt arrangement of any one of claims 8 through 11, wherein said projecting member is a rod.

* * * * *